United States Patent [19]

Kackenmeister

[11] 4,399,491
[45] Aug. 16, 1983

[54] FOLDED EDGE SEAL FOR FLASHLAMP ARRAY

[75] Inventor: Carl F. Kackenmeister, Williamsport, Pa.

[73] Assignee: GTE Products Corporation, Stamford, Conn.

[21] Appl. No.: 401,451

[22] Filed: Jul. 26, 1982

Related U.S. Application Data

[63] Continuation of Ser. No. 238,866, Feb. 27, 1981, abandoned.

[51] Int. Cl.³ .................. B29C 27/08; G03B 15/02
[52] U.S. Cl. ..................................... 362/11; 156/73.1; 156/216; 156/217; 156/290; 156/292; 264/23; 264/248; 431/357
[58] Field of Search ................ 156/70, 73.1, 216, 69, 156/217, 290, 292, 308.4, 580.1; 264/23, 248, 249; 29/509, 513; D16/42; 431/357, 358, 359, 364; 206/316, 420; 428/35; 362/11, 13–15

[56] References Cited

U.S. PATENT DOCUMENTS

| 3,303,255 | 2/1967 | Bracey, Jr. | 264/248 |
| 4,187,768 | 2/1980 | Suzuki | 156/73.1 |
| 4,326,241 | 4/1982 | Broadt et al. | 362/11 |

Primary Examiner—Michael G. Wityshyn
Attorney, Agent, or Firm—Thomas H. Buffton

[57] ABSTRACT

A multi-lamp photoflash unit has a plastic housing member with a back portion having a plurality of cavities formed to receive a reflector unit wherein is disposed a plurality of flashlamps and a light transmitting front portion formed to fold over and enclose the flashlamps and is characterized by the improvement wherein at least one part of one of the front and back portions of the plastic housing is folded over the edge of the other, aligned in parallel with and sealed to the other of the front and back portions to provide a shear-type seal. The multi-lamp photoflash unit is fabricated by a process wherein the front and back layers are contacted, one is folded over, aligned with and sealed to the other by spaced spot seals.

9 Claims, 5 Drawing Figures ly 4,399,491

FOLDED EDGE SEAL FOR FLASHLAMP ARRAY

CROSS REFERENCE TO OTHER APPLICATIONS

This application is a Continuation of an application bearing U.S. Ser. No. 238,866, filed Feb. 27, 1981 and assigned to the assignee of the present application now abandoned.

An application bearing U.S. Ser. No. 238,865, filed Feb. 27, 1981, entitled "Knurled Seal Flashlamp Array" in the names of David R. Broadt and Carl F. Kackenmeister and assigned to the Assignee of the present application relates to multi-lamp photoflash knurled sealing.

TECHNICAL FIELD

This invention relates to flashlamp arrays and more particularly to a flashlamp array having a plastic housing member with a folded edge seal and a process for effecting the folded seal.

BACKGROUND ART

In the manufacture of flashlamp arrays and particularly multi-lamp flashlamp arrays it is a common practice to enclose the array within a plastic cover. This plastic cover serves not only to provide structural integrity but also provides security from injury for the consumer. In both cases, structural integrity and consumer security, mechanical or chemical bonding of the plastic cover is an essential ingredient.

Bonding of flashlamp arrays employing mechanical and chemical techniques such as hot-melt adhesives and glues has been found to be somewhat less than satisfactory in high production operations for numerous reasons. For example, most adhesives and glues tend to be cumbersome to handle at best and chemical bonding in general tends toward the undesired presence of toxic and often flammable conditions. However, such techniques have been and still are utilized with varying degrees of success.

Other bonding techniques include heat sealing of plastic surfaces and ultrasonic sealing of plastic surfaces for example. In a heat sealing process, it is common to position a pair of layers of plastic in contact with one another and to apply heat thereto in an amount sufficient to melt the plastic layers such that they are welded to one another. Unfortunately, heat sealing is often dependent upon heat from high temperature lamps which tend to exhibit life problems, cooling problems and replacement problems. Also, the plastic must be such that it absorbs heat in an amount sufficient to soften the plastic and then cools at a rate which corresponds to a desired rate of production.

On the other hand, ultrasonic bonding is dependent upon the transformation of sonic energy into friction and heat by the mechanical movement of the plastic layers with respect to one another. As a result, the plastic layers must have similar characteristics, a low melting temperature and good conduct therebetween because of the limited vibratory movement of the plastic layers.

Importantly, the known multi-lamp photoflash arrays include a pair of flat and smooth plastic surfaces in contact with one another and enclosing the operational components of the array. Thus, heat sealing or ultrasonic bonding is appropriate. However, this type of seal tends to provide a peel-type mode of bonding wherein the seal is subjected to a peal-type stress which is neither flexible nor particularly strong insofar as resistance to pressure is concerned.

SUMMARY OF THE INVENTION

An object of the present invention is to provide an improved multi-lamp photoflash array. Another object of the invention is to enhance the bonding of a plastic housing member of a multi-lamp photoflash array. Still another object of the invention is to provide an improved shear-type stress bonding of a multi-lamp photoflash unit.

These and other and further objects, advantages and capabilities are achieved in one aspect of the invention by a multi-lamp photoflash unit having a plastic housing member with front and back portions wherein a part of one of the front and back portions is folded over the edge of and sealed to the other.

In another aspect of the invention a process for sealing a plastic housing member of a multi-lamp photoflash unit is provided wherein multiple layers of plastic are positioned intermediate a pair of head members, contacted by the head members and energized with the sealing process characterized by the improvement wherein one plastic layer is folded around the edge of the other and the folded plastic layer is sealed to the other plastic layer.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
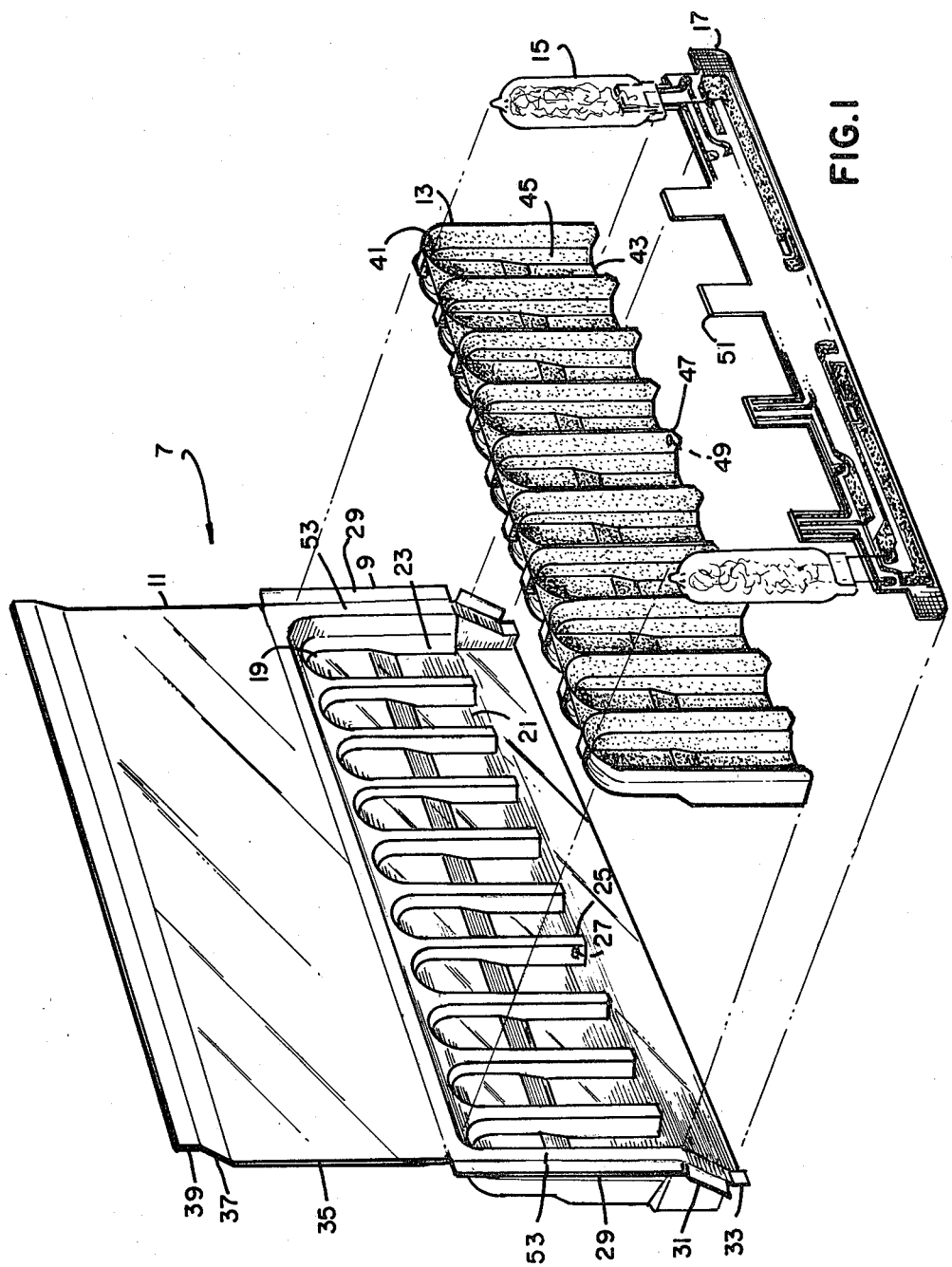
FIG. 1 is an exploded view of a multi-lamp photoflash array illustrating a preferred embodiment of the invention.

In the drawings, FIG. 1 illustrates a multi-lamp photoflash unit having a plastic housing member 7 with a back portion 9 and a front portion 11. A reflector unit 13 is formed for positional location within the housing member 7 and a multiplicity of flashlamps 15 are affixed to a printed circuit board 17 and also located within the housing member 7.

More specifically, the back portion 9 of the housing member 7 includes a plurality of cavities 19 each having an off-set portion 21 and a pair of oppositely disposed sidewalls 23 in a plane substantially normal to the opening of the cavities 19. The cavities 19 are spaced from one another by a bridging member 25 wherein is disposed a venting aperture 27. Also, the back portion 9 has extending outwardly therefrom a first tab-like portion 29, a tapering portion 31 and a second tab-like portion 33.

The front portion 11 of the housing member is of a light transmitting plastic material foldably connected to the back portion 9. This front portion 11 includes a first flat portion 35 connected by a tapering portion 37 to a second flat portion 39. This back portion 11 is formed to fold and provide displaced overlapping of said tab-like portion 29, tapering portion 31 and second tab-like portion 33 by said first flat portion 35, tapering portion 37 and second flat portion 39.

The reflector unit 13 has a multiplicity of reflector cavities 41 each having a surface of reflective material and formed to nest within the cavities 19 of the back portion 9 of the housing member 7. These reflector cavities 41 also have an off-set portion 43, a pair of sidewalls 45 in a plane normal to the opening and are spaced from one another by a spacer 47 wherein is provided a vent hole 49 aligned with the aperture 27 of the back portion 9.

A plurality of flashlamps 15 are mechanically and electrically connected to a printed circuit board 17 and disposed within the cavities 41 of the reflector unit 13. Moreover, finger-like members 51 extending outwardly from the printed circuit board 17 are positionally located within the off-set portion 43 of the reflector unit 13. Thereafter, the light-transmitting front portion 11 of the housing member 7 is folded to provide an envelope wherein the flashlamps 15 are contained.

Figure 2:
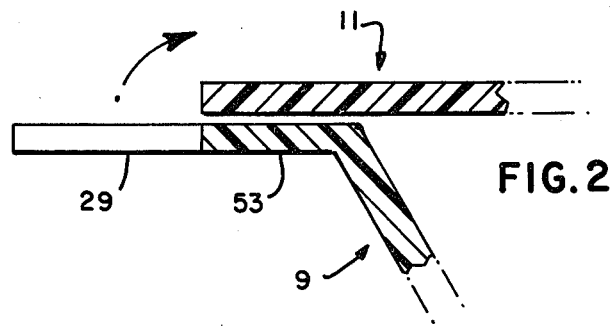
FIGS. 2, 3, and 4 illustrate a process for fabricating the bonded housing member of the invention.
Figure 3:
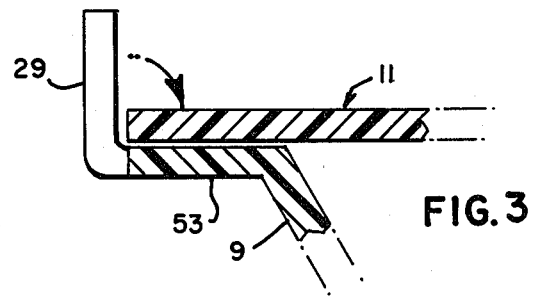
Figure 4:
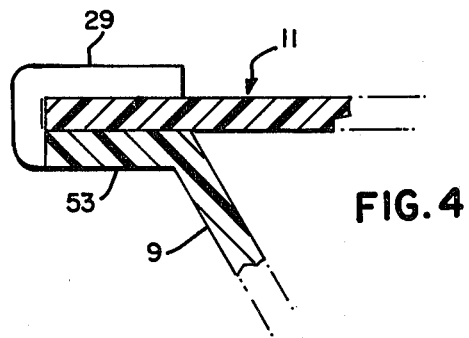

As can be seen in FIGS. 2, 3, and 4, the back and front portions 9 and 11 of the housing member 7 are sealed to one another. For example, a first part 53 of the back portion 9 is placed in contact with the front portion 11. A second part 29 of the back portion 9 is folded around the front portion 11, aligned in parallel with and sealed to the front portion 11.

Thus, there is provided a seal wherein the force exerted thereon from the interior of the plastic housing member is a shear force as opposed to prior known peel-like forces. Moreover, it is known that a much stronger seal is provided when the seal is exposed to a shear stress as opposed to a peal stress.

It may be noted that the above-described sealing procedure may be reversed wherein a part of the front portion 11 of the housing member 7 is folded around the back portion 9 of the housing member 7. Also, the back and front portions 9 and 11 may be formed such that portions of either one may be folded over and sealed to the other to provide the above-described shear-type seal.

Alternatively, both the back and front portions 9 and 11 may be simultaneously folded in a substantially U-shaped configuration such that one of the back and front portions 9 and 11 is folded back upon itself and sealed thereto. Again, a shear-type seal is provided whereby the bonding and flexibility of the structure is enhanced.

Figure 5:
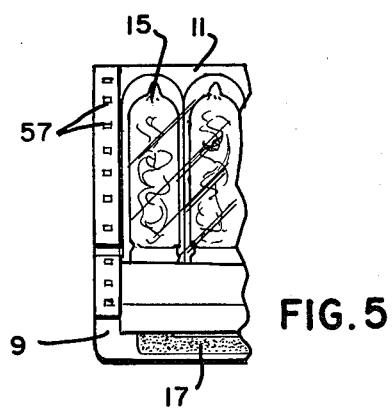
FIG. 5 is an elevational view illustrating the preferred multi-lamp photoflash unit employing an embodiment of the invention.

Additionally, FIG. 5 illustrates the sealed multi-lamp photoflash unit wherein the above-described stress-type seal has been incorporated. As can readily be seen, sealing is in the form of spaced spot seals 57 as opposed to a single continuous seal. It has been determined that a continuous seal is inferior to spaced spot seals due to the undesired formation of a continuous and relatively weakened section of the plastic housing member 7 which occurs with a continuous seal and is not present with spaced spot seals.

While there has been shown and described what is at present considered preferred embodiments of the invention, it will be obvious to those skilled in the art that various changes and modifications may be made therein without departing from the invention as defined by the appended claims.

INDUSTRIAL APPLICABILITY

A seal for a plastic housing member of a multi-lamp photoflash unit has been provided wherein a tab member of one of the front and back portions of the housing member is folded around the edge of the other and sealed to the other by a plurality of spaced spot seals. This type of seal configuration provides a seal wherein the stress exerted thereon is a shear stress as compared with the usual peel-type stress encountered when plastic surfaces are merely bonded to one another.

In addition to the enhanced bonding strength provided by a seal which is under a shearing stress, it is to be noted that the above-described folded configuration provides an increased degree of flexibility as compared with usual bonding and attains a desired increased capability to resist rupture. As a result, containment of the flashlamps within the housing member is enhanced.

Further, the spaced spot seals, which may be provided by ultrasonic or heat sealing sources for example, are free from the undesired weakness frequently encountered when a continuous seal on a plastic material is utilized. Thus, a multi-lamp photoflash unit has been provided wherein enhanced bonding provides a shear-type seal of improved strength and increased structural flexibility. Moreover, the spot spaced seal is relatively free from development of undesired weakness of the plastic material as is often present in a continuously sealed plastic structure.

What is claimed is:

1. In a multilamp photoflash unit having a plastic housing member with a foldable light transmittable front portion and multiple cavity back portion formed for enclosure of flashlamps therein, a plastic housing member sealing process comprising the steps of:
    folding one of said front and back portions of said plastic housing member with respect to the other to form an envelope for enclosing a plurality of flashlamps;
    wrapping a portion of said one of said folded front and back portions about the edge of the other one thereof and aligning said portions to provide more than two layers of plastic housing member;
    positioning said multiple layers of wrapped plastic housing member portions intermediate an energizing source; and
    activating said energy source to seal at least one of said wrapped plastic layers to another and provide a plastic housing enclosure and container for a multiplicity of flashlamps.

2. The plastic housing member sealing process of claim 1 wherein said front portion of said housing member is wrapped about and sealed to said multiple cavity back portion to provide a flashlamp envelope.

3. The plastic housing member sealing process of claim 1 wherein said back portion of said housing member is wrapped about and sealed to said front portion of said multilamp photoflash unit housing member.

4. The plastic housing member sealing process of claim 1 wherein one of said wrapped front and back plastic housing member portions is sealed to the other with multiple spot seals.

5. A multilamp photoflash unit comprising:
    a printed circuit board having a printed circuit thereon;
    a plurality of photoflash lamps affixed to said printed circuit of said circuit board;

a reflector unit having a plurality of cavities formed to receive said photoflash lamps; and a plastic housing member having a back portion with a plurality of cavities wherein is positioned said reflector unit and said flashlamps and a foldable light transmitting front portion forming an envelope containing said photoflash lamps and reflector unit, said front and back portions contacting said printed circuit board and affixed thereto and one of said front and back portions wrapped about and in alignment with the edge of and sealed to the other one of said front and back portions of said plastic housing member whereby said sealed wrapped front and back portions form a seal subjected to a shear-like force.

6. The multilamp photoflash unit of claim 5 wherein said back portion is wrapped about and sealed to said front portion of said plastic housing member.

7. The multilamp photoflash unit of claim 5 wherein said front portion is wrapped about and sealed to said back portion of said plastic housing member.

8. The multilamp photoflash unit of claim 5 wherein said wrapped front and back portions are sealed to one another by a plurality of spaced spot seals.

9. The multilamp photoflash unit of claim 5 wherein said wrapped front and back portions of said plastic housing member are sealed to one another by spaced heat seals.

* * * * *